(12) United States Patent
Grossman

(10) Patent No.: US 10,124,954 B2
(45) Date of Patent: Nov. 13, 2018

(54) INFUSER COATED WITH A SEALANT

(71) Applicant: David G Grossman, Vienna, VA (US)

(72) Inventor: David G Grossman, Vienna, VA (US)

( * ) Notice: Subject to any disclaimer, the term of this patent is extended or adjusted under 35 U.S.C. 154(b) by 0 days.

(21) Appl. No.: 14/988,759

(22) Filed: Jan. 6, 2016

(65) Prior Publication Data

US 2016/0200502 A1    Jul. 14, 2016

Related U.S. Application Data

(60) Provisional application No. 62/101,002, filed on Jan. 8, 2015.

(51) Int. Cl.
*B65D 85/808* (2006.01)
*B65B 29/02* (2006.01)
*A23L 21/25* (2016.01)

(52) U.S. Cl.
CPC ............ *B65D 85/808* (2013.01); *A23L 21/25* (2016.08); *B65B 29/02* (2013.01); *A23V 2002/00* (2013.01)

(58) Field of Classification Search
CPC ....... B65D 85/808; A23L 21/25; B65B 29/02; A23V 2002/00
See application file for complete search history.

(56) References Cited

U.S. PATENT DOCUMENTS

| | | | | |
|---|---|---|---|---|
| 4,913,916 A * | 4/1990 | Tanner | ................. | B65D 85/808 426/80 |
| 5,866,185 A * | 2/1999 | Burkett | ................ | A47G 21/004 206/0.5 |
| 2004/0255788 A1* | 12/2004 | Bowe | ................. | B65D 81/3261 99/279 |
| 2008/0305216 A1* | 12/2008 | Crawford | ............ | A23L 1/22016 426/89 |
| 2011/0177141 A1* | 7/2011 | Celeste | ............. | A47G 19/2205 424/401 |
| 2012/0207831 A1* | 8/2012 | Stella | .................... | A61K 9/2068 424/465 |
| 2013/0224339 A1* | 8/2013 | Chang | ................. | B65D 85/808 426/78 |
| 2014/0199460 A1* | 7/2014 | Lee | ......................... | C08L 1/286 426/548 |
| 2014/0342059 A1* | 11/2014 | Trombetta | ......... | B65D 85/8043 426/115 |

FOREIGN PATENT DOCUMENTS

| DE | 20216276 U1 * | 1/2003 | ........... B65D 65/463 |
|---|---|---|---|
| WO | WO 2013045765 A1 * | 4/2013 | ............. B65B 29/02 |

* cited by examiner

*Primary Examiner* — Viren A Thakur
*Assistant Examiner* — Thanh H Nguyen
(74) *Attorney, Agent, or Firm* — David Grossman

(57) ABSTRACT

An infuser comprises a container comprising a material with pores, content(s) bounded by the container, and a sealing substance configured to resist substantial movement of the content(s) through the pores of the material until the sealing substance is exposed to an external solvent.

19 Claims, 17 Drawing Sheets

INFUSER COATED WITH A SEALANT

CROSS-REFERENCE TO RELATED APPLICATIONS

This application claims the benefit of U.S. Provisional Application No. 62/101,002 filed Jan. 8, 2015, which is hereby incorporated by reference in its entirety.

DETAILED DESCRIPTION OF EMBODIMENTS

Figure 1:
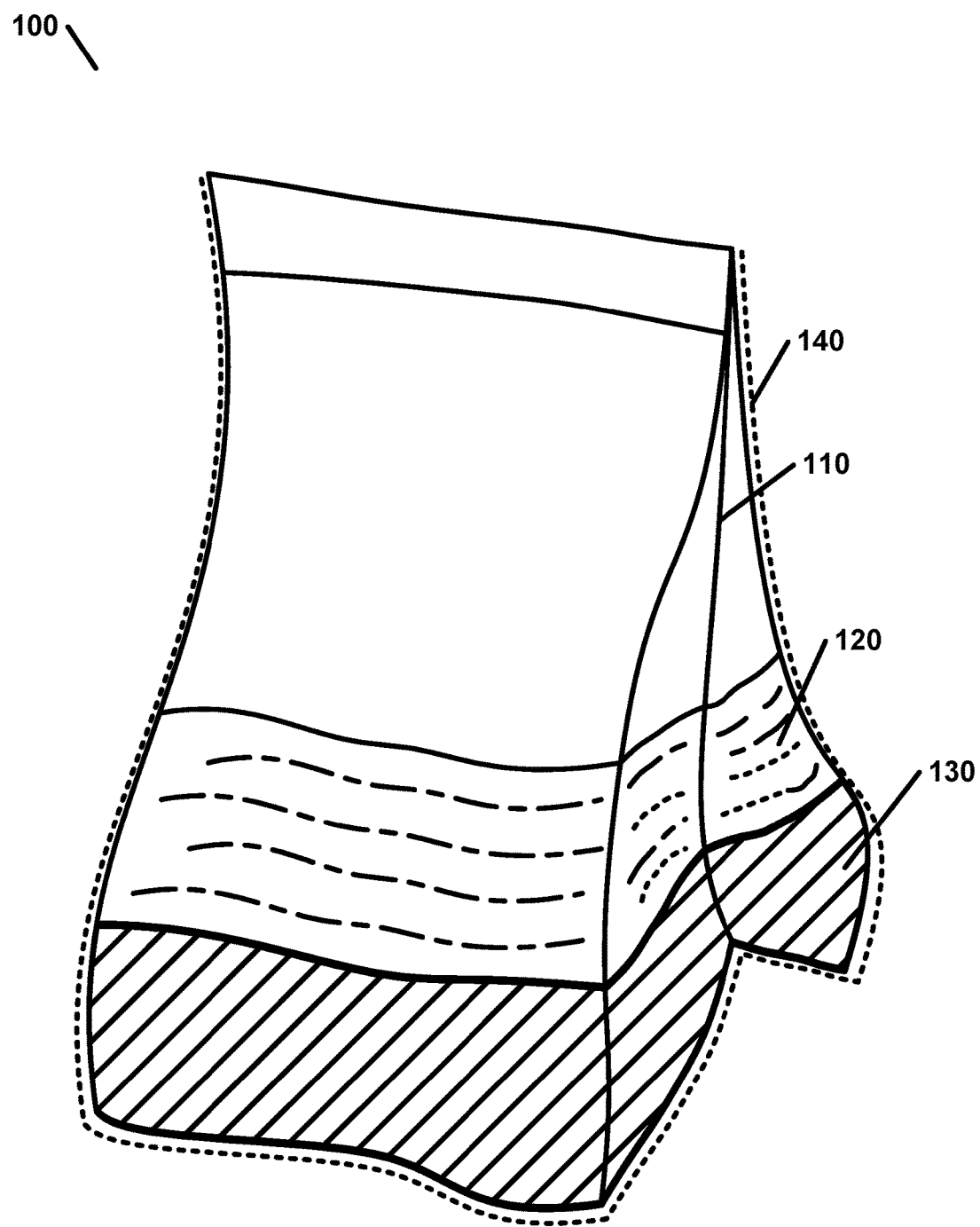
FIG. 1 is an example illustration of a perspective view of tea leaves and creamed honey within a tea bag coated with a dried mixture comprising honey according to various aspects of an embodiment of the invention.

Embodiments of the invention dispose one or more contents in a porous container coated with a sealant configured to resist movement of the contents through the porous container until exposed to a solvent in which the sealant and at least one of the contents are substantially soluble. For example, some of the various embodiments may comprise a filter bag configured to prevent leakage of tea and/or honey until the tea bag is immersed in hot water, a wire mesh container configured to prevent leakage of paint powder until the container is immersed in paint thinner, and a plastic cage with holes configured to prevent leakage of a fuel additive until immersed in gasoline or diesel fuel. Additional example embodiments may comprise containers comprised to prevent leakage of chocolate, coffee, and/or lemonade until immersed in water. Further additional embodiments may comprise containers comprised to prevent leakage of glue, stain, and/or paint until immersed in solvents.

Embodiments of the invention may comprise a coating or sealant on the filter bag, cage, and/or container configured to resist movement of at least one of the contents by at least partially obstructing the holes or pores of the container until exposure to a solvent. Embodiments of the invention may loosen and/or dissolve the sealant such that obstruction of the holes or pores may lessen to an extent that allows an external solvent to enter the container and/or (a) content(s), or components thereof, to intermingle with the solvent and exit the container. For example, an embodiment may comprise a coating of a dried sealant comprising honey on a filter bag containing tea and creamed honey that melts and/or dissolves when exposed to hot water. Another example embodiment may comprise a coating of dried acetone-soluble glue on wire mesh container containing paint powder that dissolves when exposed to acetone. Yet another example embodiment may comprise a coating of cellulose on a plastic cage containing powdered lemonade that loosens when exposed to water.

In the context of the embodiments, the meaning of the term "infuser" may comprise an apparatus for distributing contents bounded by a container into an external liquid. According to some of the various embodiments, the infuser may allow distribution of all of the contents, some of the contents, one of the contents, and/or components of the contents. For example, an embodiment may be configured to prevent exit of tea leaves from the container, but to allow distribution of water-soluble components of the tea leaves into the external liquid. Another example embodiment may be configured to prevent the exit of solid contents of a size from the container, but to allow the distribution of solid contents smaller than that certain size.

In the context of the embodiments, the meaning of the term "porous" comprises having, pores, holes, and/or spaces through which a solvent and at least some contents may pass through. The pores, holes, and/or spaces may be of various sizes and/or shapes. According to some of the various embodiments, pores, holes, and/or spaces may be present due to the structure of a material and/or container. Some pores, holes, and/or spaces may comprise spaces between the fibers of filter paper and/or the strands of a metal mesh. Some pores, holes, and/or spaces may be formed by puncturing and/or forming (e.g. molding) a material and/or container. For example, pores, holes, and/or spaces may be formed during a molding process used to create the container.

In the context of the embodiments, a "container" may comprise a structure configured to hold one or more contents. A container may comprise various shapes or sizes and may comprise various materials, whether natural, synthetic, a combination thereof, and/or the like. The container may comprise a single unit or multiple components that together form a structure configured to hold one or more contents. The container may comprise filter paper, wire mesh, porous polymer, porous membrane, semi-permeable membrane, combinations thereof, and/or the like.

In the context of the embodiments, the term "coating," "sealant," and "sealing substance" comprises, without limitation, substance(s) or mixture(s) of substances that substantially resists movement of the contents through the porous container. In this context, substantially, means that a majority (e.g. over 70%-80%) of the substance(s) or mixture(s) of substances will resists movement through the porous container until affected by a solvent (e.g. honey dissolved by hot water). The sealant or sealing substance may comprise salt, sugar, starch, dried honey, gelatin, glue, cellulose, artificial sweeteners, combinations thereof, and/or the like.

In the context of the embodiments, the term "honey" comprises natural honey, creamed honey, spun honey, dried honey, whipped honey, partially-crystallized honey, a dry flavoring substance, a semi-dry flavoring substance, combinations thereof, and/or the like.

In the context of the embodiments, the term "diffusible" comprises the capacity to dissolve in, mix with, and/or be suspended in a solvent.

In the context of the embodiments, the term "brewable" comprises the capacity to release in a hot solvent substances that have the capacity to dissolve in, mix with, and/or be suspended in a solvent.

Referring to FIG. 1 and according to some of the various embodiments, tea leaves 130 and creamed honey 120 may be disposed inside a tea bag 110 coated with a mixture comprising dried honey 140. The coating comprising dried honey 140 may act as a sealant to resist leakage of the creamed honey 120 through the pores of a filter paper that form the walls of the tea bag 110. When the tea bag 110 is immersed in water, the coating comprising dried honey 140 may at least partially dissolve, disrupting its resistive quality and allowing water to enter the tea bag 110 and intermingle with the tea leaves 130 and creamed honey 120. Additionally, the mixture of water, creamed honey, and various components of the tea leaves may exit the tea bag 110 through the pores when the coating of dried honey 140 at least partially dissolves.

Figure 2:
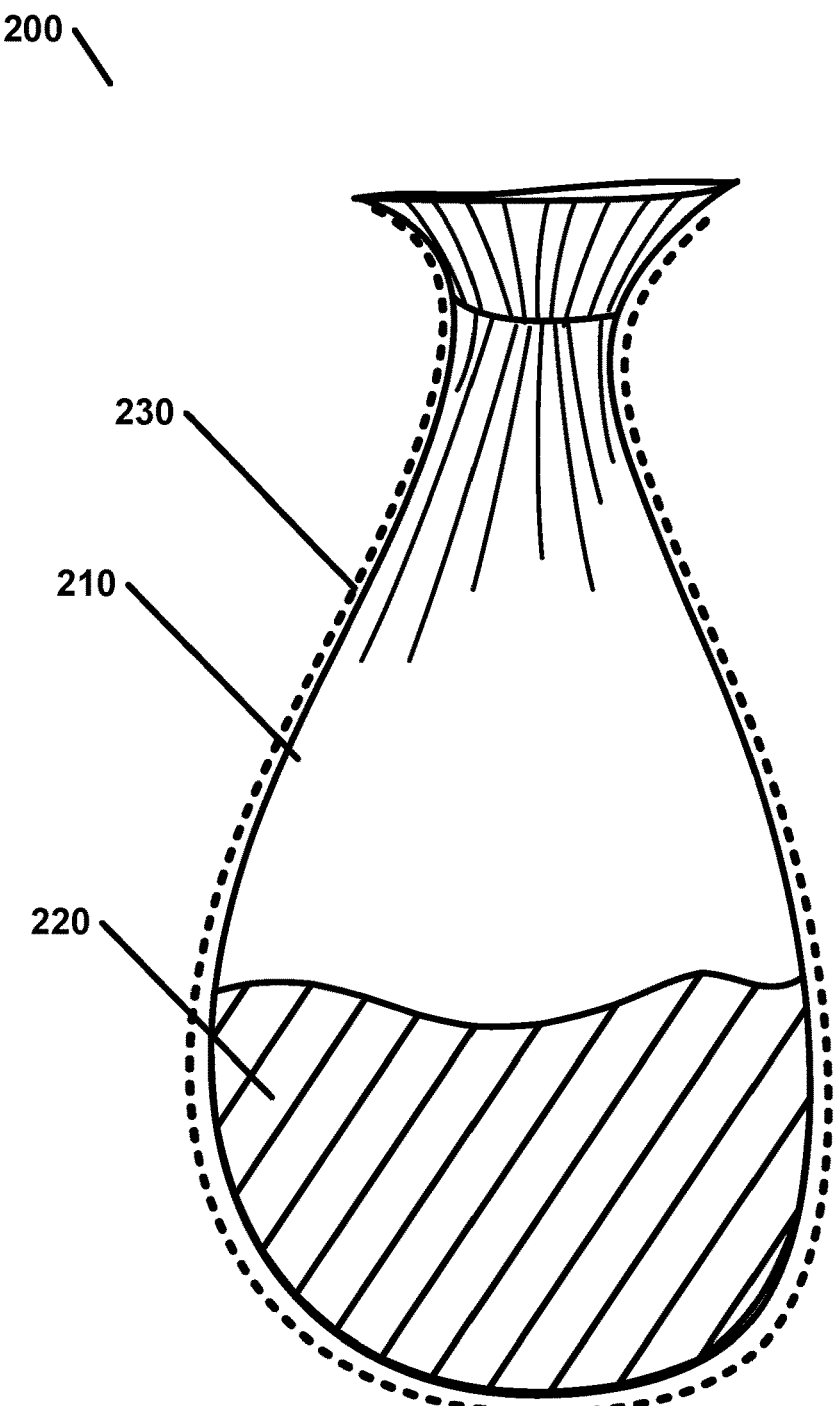
FIG. 2 is an example illustration of a transverse view of an embodiment of the invention.

Referring to FIG. 2 and according to some of the various embodiments, one or more contents 220 may be disposed in a porous container 210 coated with a sealing substance 230.

The sealing substance 230 may be configured to resist movement of the contents 220 through the pores of the porous container 210. According to some of the various embodiments, the sealing substance 230 may resist movement of the contents 220 through the porous container 210 by at least partially occluding at least of a portion of the pores, holes, or spaces of the porous container 210. In other embodiments, the sealing substance 230 may be configured to resist movement of the contents 220 through the porous container 210 by decreasing the size of the pores, holes, or spaces by, for example, pulling the fibers in a filter paper closer together.

Figure 3C:
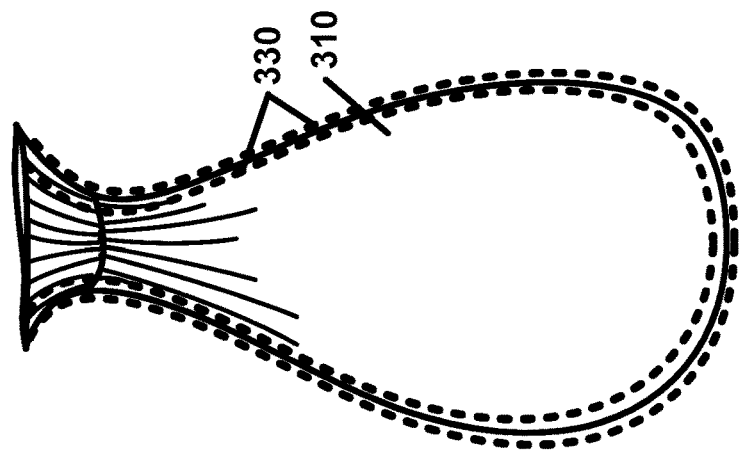
FIG. 3C is an example illustration of a transverse view of a sealing substance applied to the exterior and interior of the container according to various aspects of an embodiment of the invention.
Figure 3B:
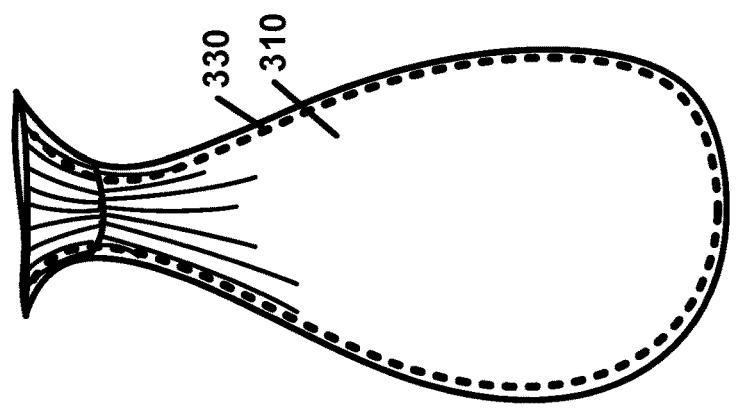
FIG. 3B is an example illustration of a transverse view of a sealing substance applied to the interior of a container according to various aspects of an embodiment of the invention.
Figure 3A:
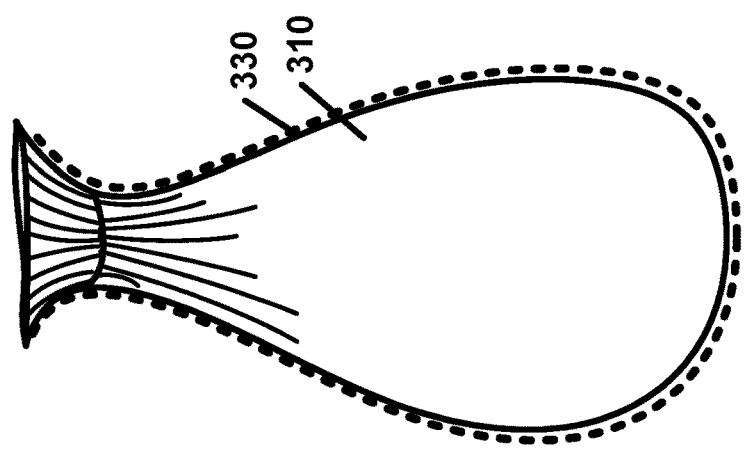
FIG. 3A is an example illustration of a transverse view of a sealing substance applied to the exterior of a container according to various aspects of an embodiment of the invention.

Referring to FIG. 3A, FIG. 3B and FIG. 3C, and according to some of the various embodiments, a sealing substance 330 may be applied to the outer surface of a porous container 310 (see FIG. 3A), the inner surface of a porous container 310 (see FIG. 3B) or both inner and outer surfaces of a porous container 310 (see FIG. 3C). According to various embodiments, the sealing substance 330 may be applied to at least a portion of the porous container 310 or to the entire porous container 310.

Figure 4:
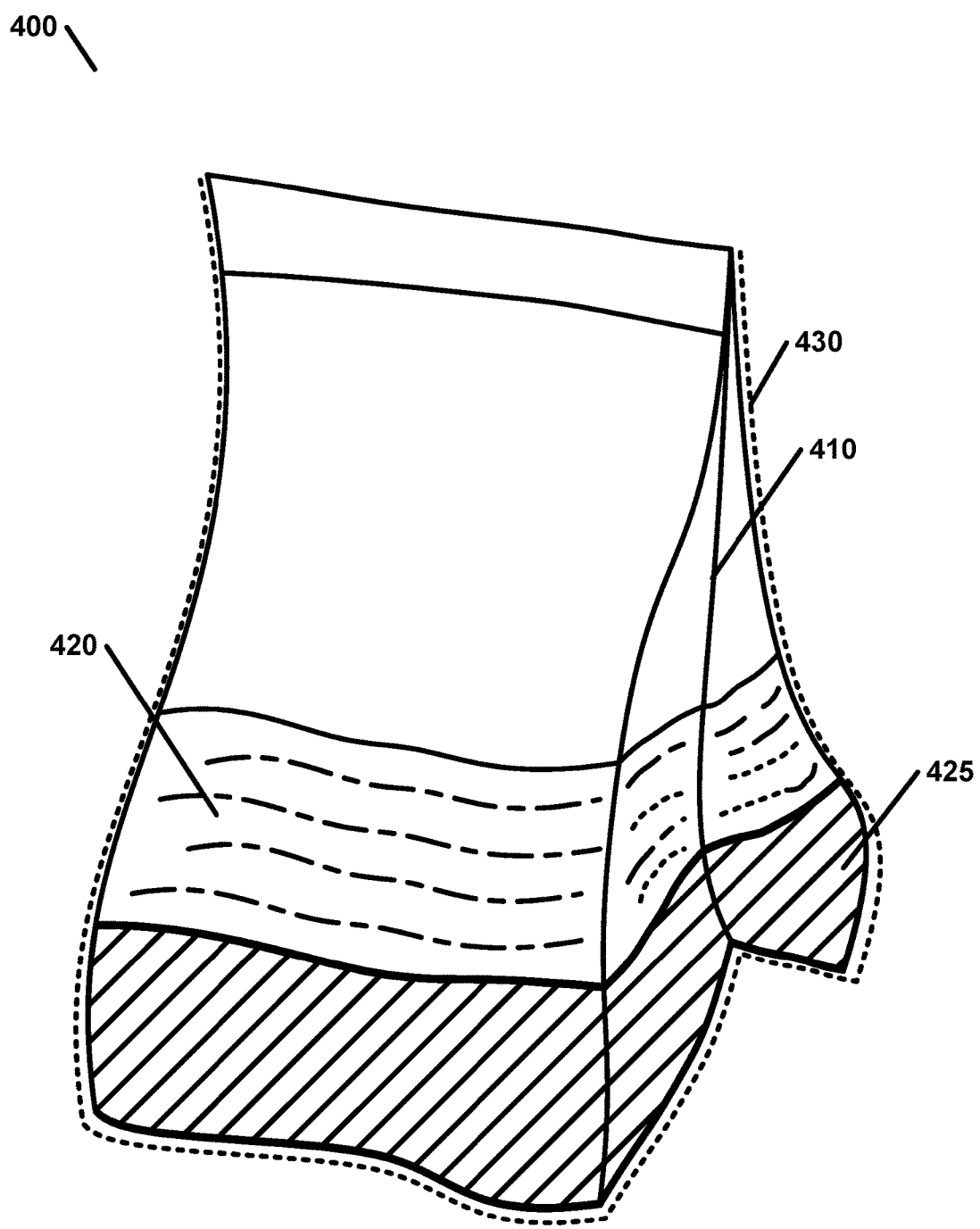
FIG. 4 is an example illustration of a perspective view of a layer of honey disposed above a layer of tea leaves according to various aspects of an embodiment of the invention.
Figure 5:
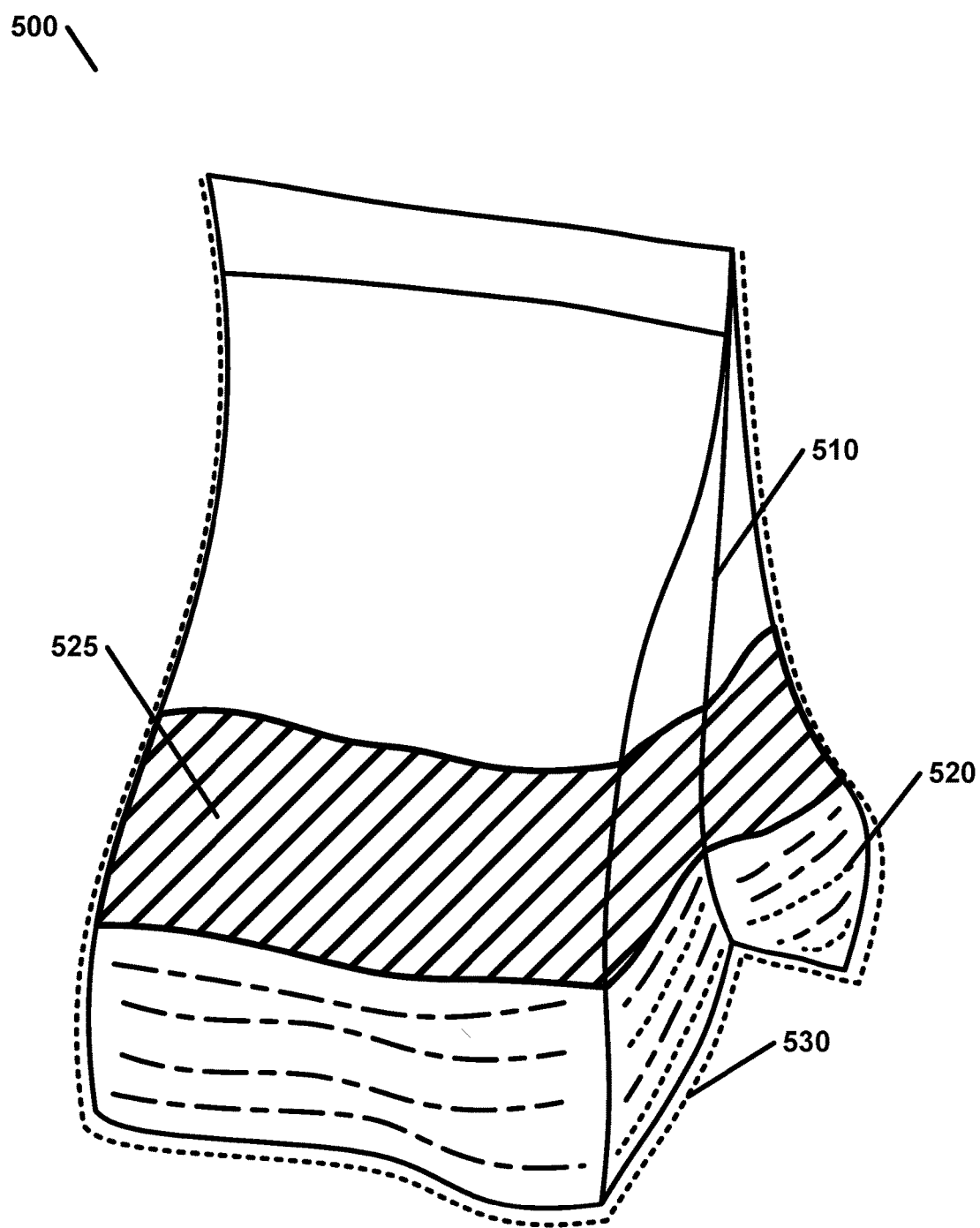
FIG. 5 is an example illustration of a perspective view of a layer of tea leaves disposed above a layer of honey according to various aspects of an embodiment of the invention.
Figure 6:
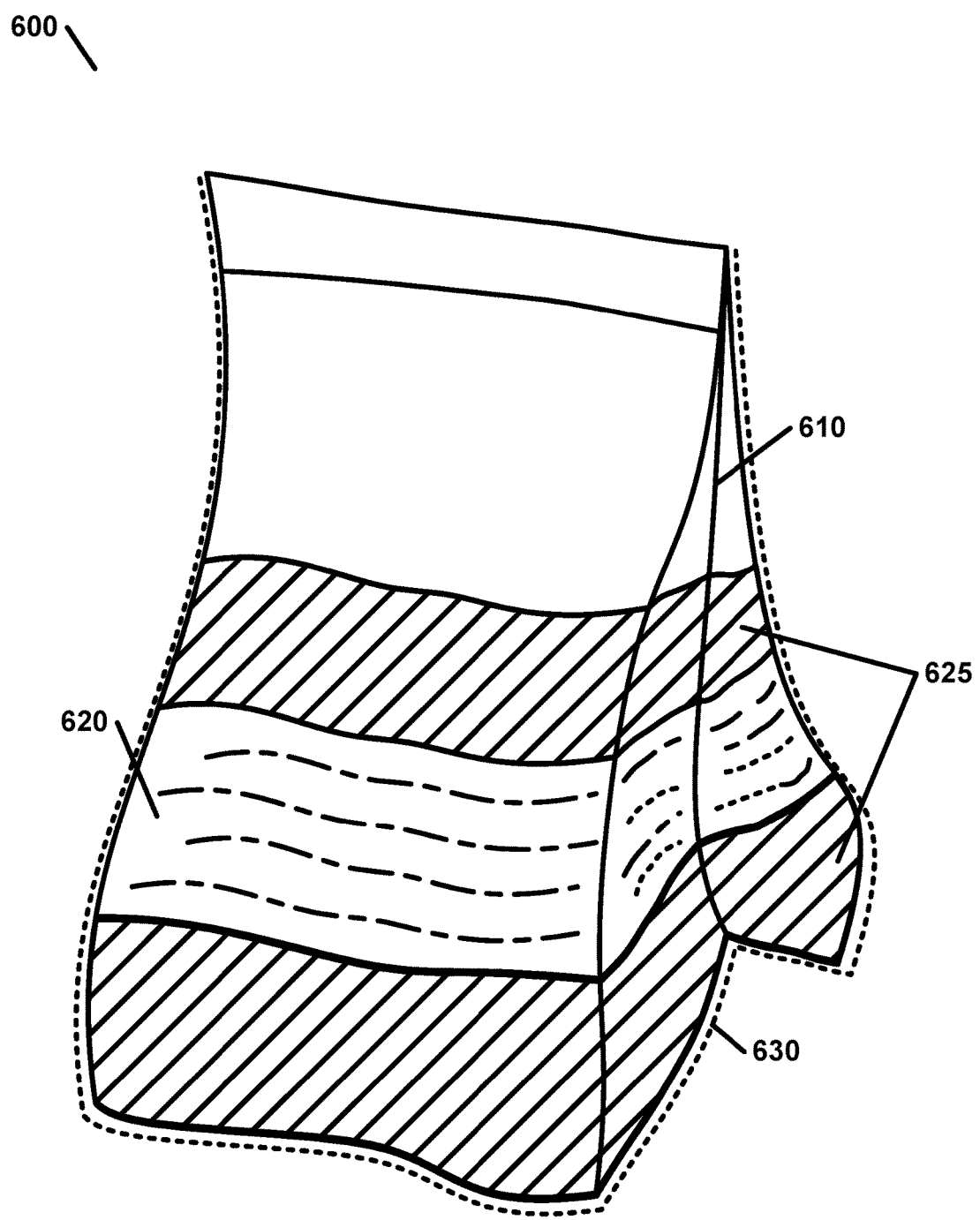
FIG. 6 is an example illustration of a perspective view of a layer of honey disposed between layers of tea leaves according to various aspects of an embodiment of the invention.
Figure 7:
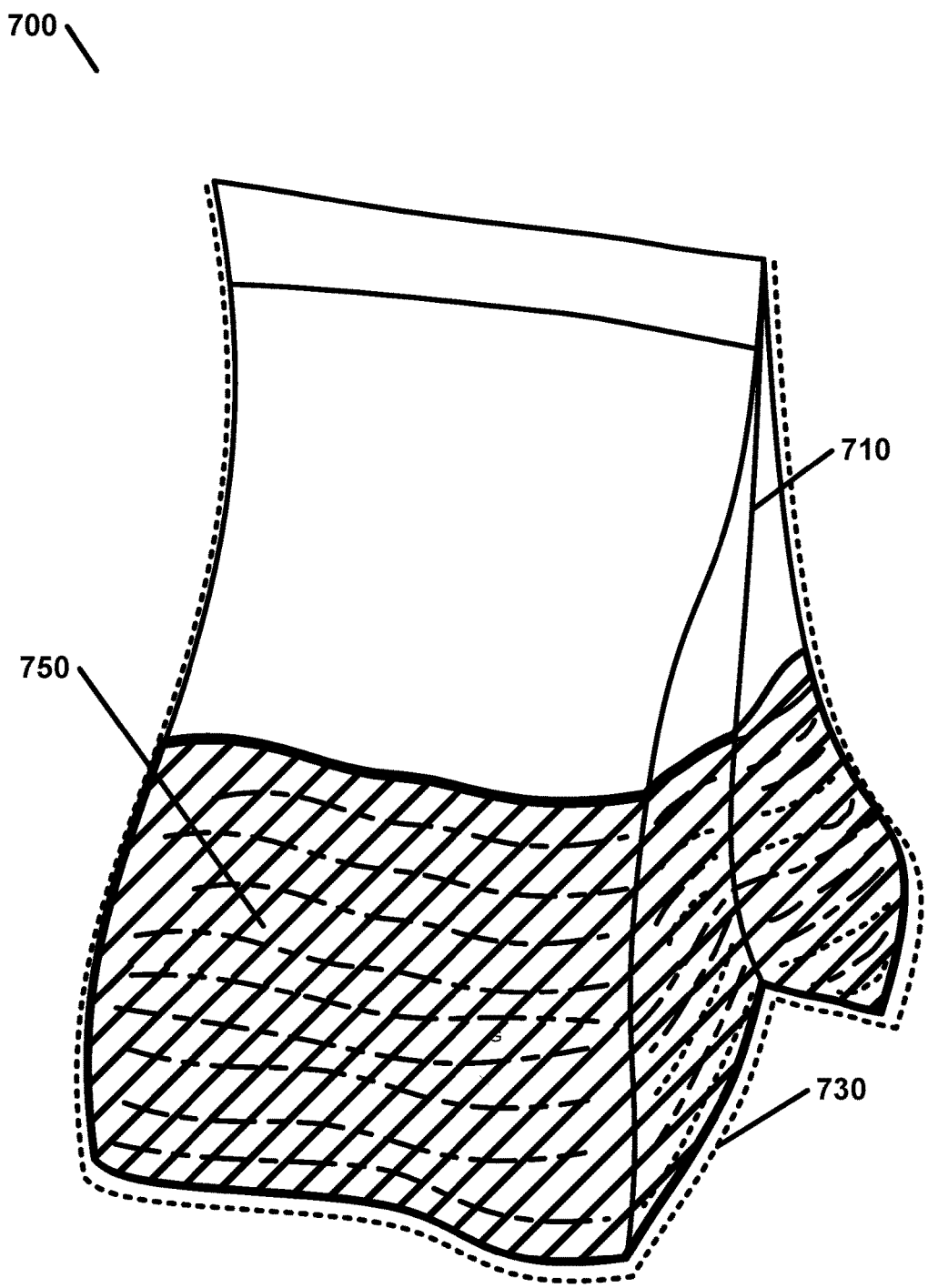
FIG. 7 is an example illustration of a perspective view of a mixture of honey and tea leaves within the container according to various aspects of an embodiment of the invention.
Figure 8:
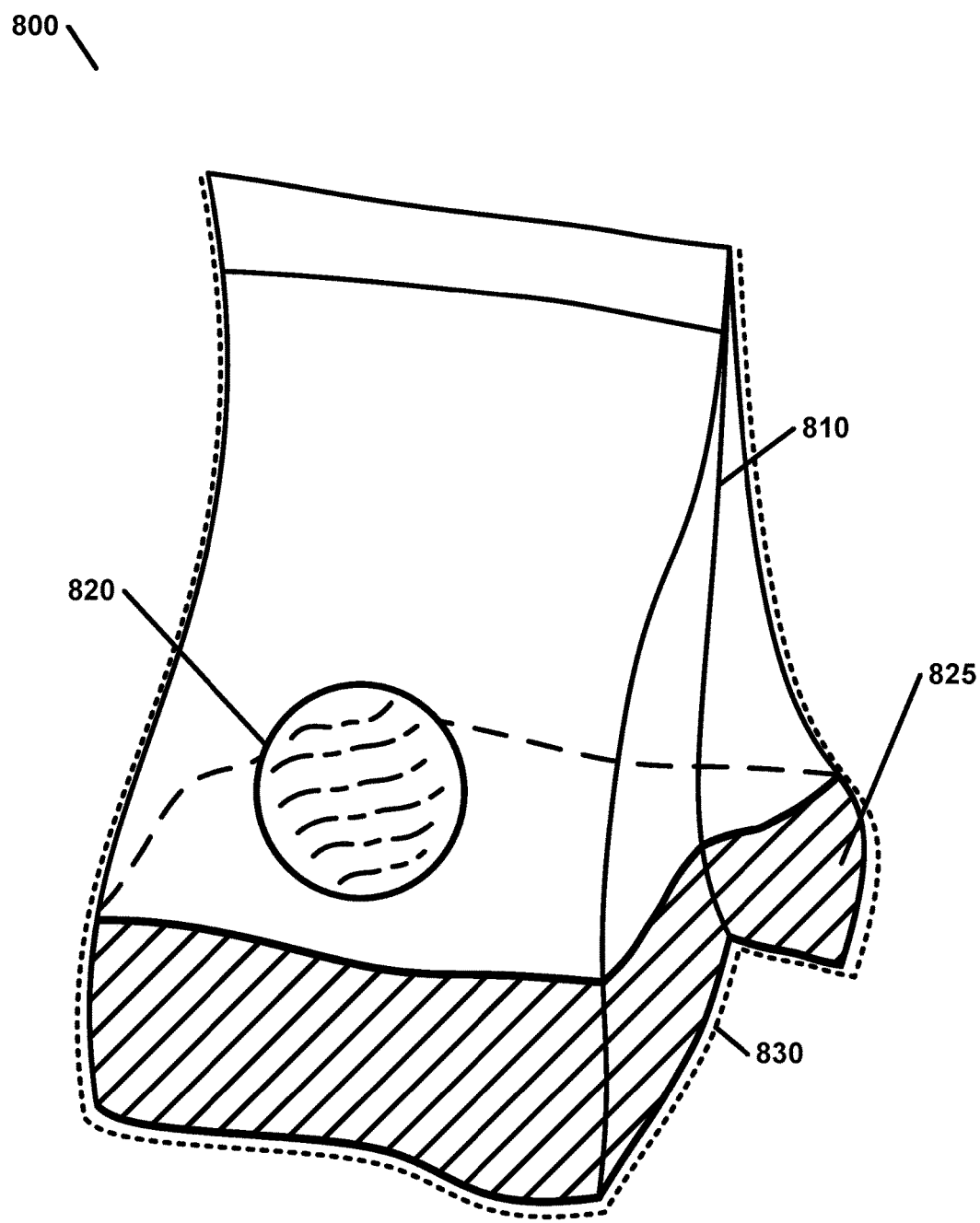
FIG. 8 is an example illustration of a perspective view of honey disposed adjacent to a layer of tea leaves within the container according to various aspects of an embodiment of the invention.

Some of the various embodiments may dispose contents in different positions with in a porous container. For example, FIG. 4 depicts an illustrative embodiment in which, for example, honey 420 is positioned above a layer of tea leaves 425, both of which may be bounded by a porous container 410 coated with a sealing substance 430. FIG. 5 depicts another illustrative embodiment in which, for example, honey 520 may be positioned below a layer of tea leaves 525, both of which are bounded by a porous container 510 coated with a sealing substance 530. FIG. 6 depicts yet another illustrative embodiment in which, for example, honey 620 may be positioned between layers of tea leaves 625, all of which may be bounded by a porous container 610 coated with a sealing substance 630. FIG. 7 depicts yet another illustrative embodiment in which, for example, a mixture of honey and tea leaves 750 may be bounded by a porous container 710 coated with a sealing substance 730. FIG. 8 depicts another illustrative embodiment in which, for example, drop(s), ball(s) and/or capsule(s) comprising a mixture with honey 820 may be disposed adjacent to tea leaves 825 and bounded by a porous container 810 coated with a sealing substance 830. Other embodiments may, for example, position contents such as honey and tea in other position(s), including, for example, layering honey and tea multiple times, surrounding honey with tea, combinations thereof, and/or the like.

Figure 9:
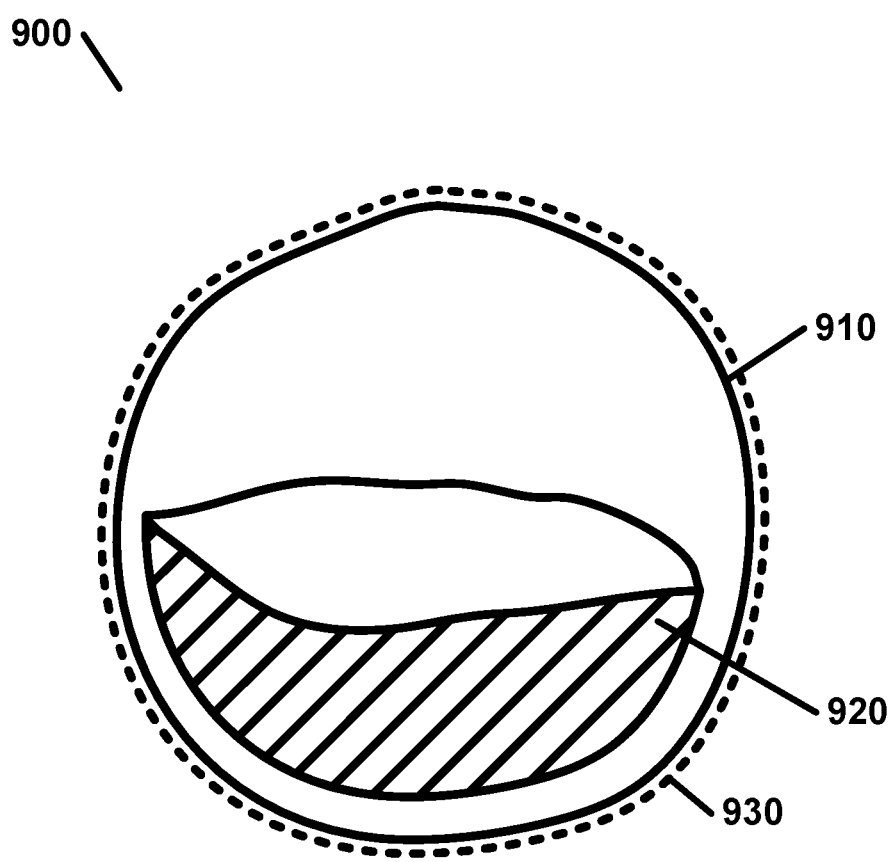
FIG. 9 is an example illustration of a perspective view of an ovoid container according to various aspects of an embodiment of the invention.
Figure 10:
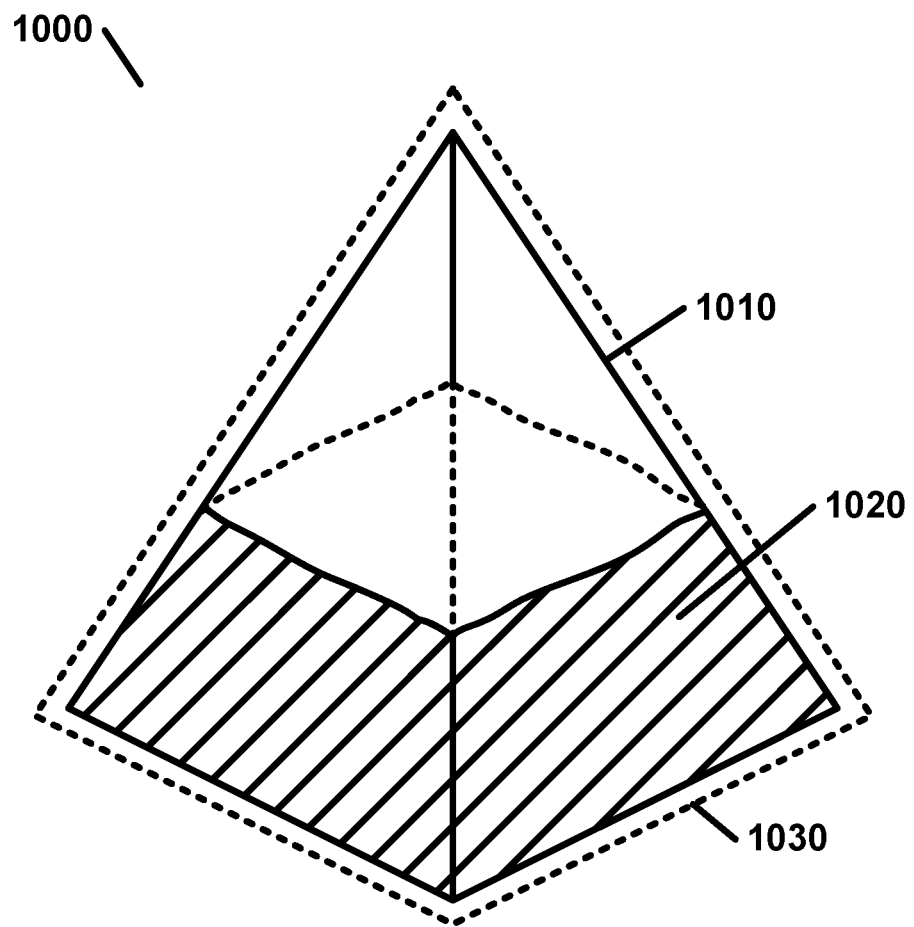
FIG. 10 is an example illustration of a perspective view of a pyramid container according to various aspects of an embodiment of the invention.
Figure 11:
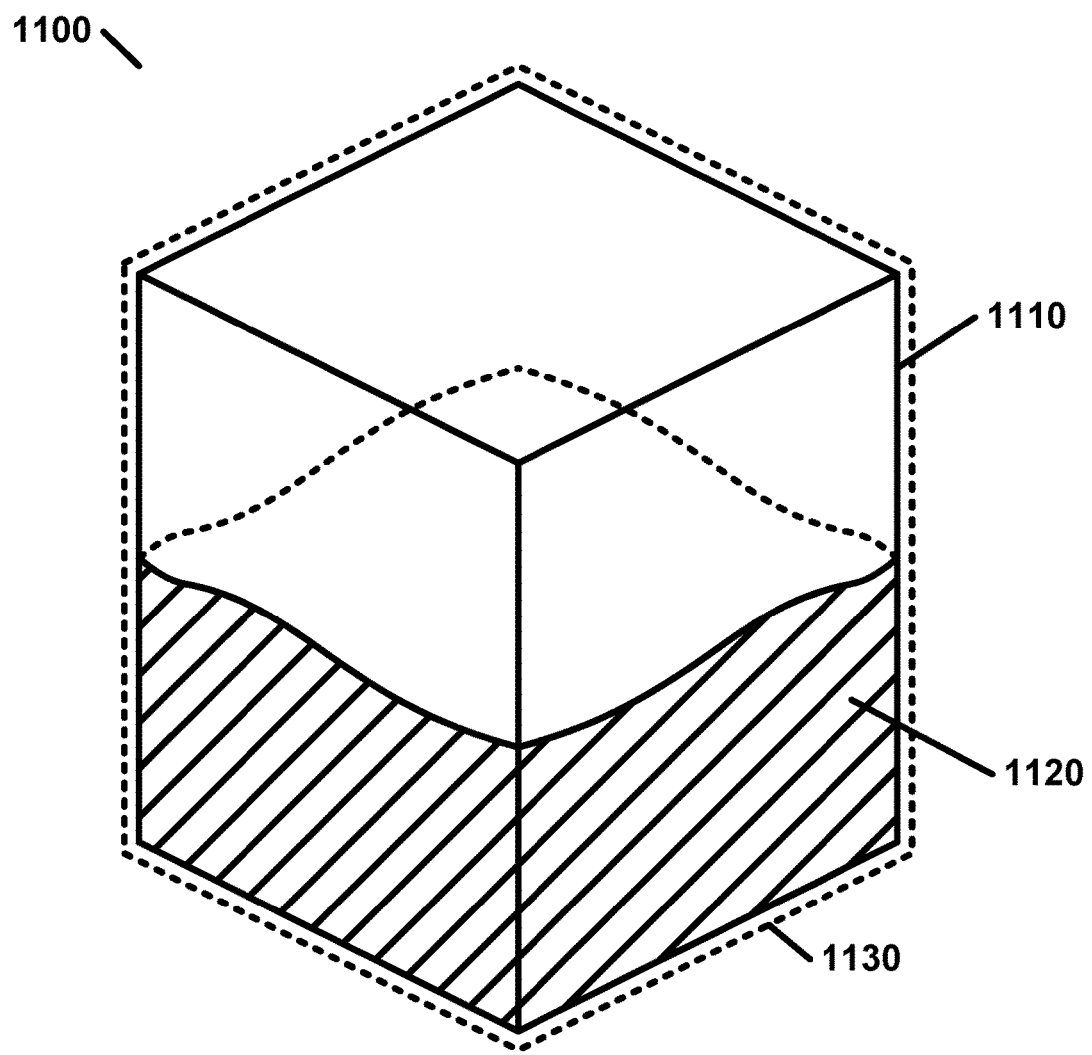
FIG. 11 is an example illustration of a perspective view of a cube container according to various aspects of an embodiment of the invention.

According to some of the various embodiments, the porous container may be configured in various shape(s). For example, FIG. 9 depicts an illustrative embodiment in which, for example, one or more contents 920 may be bounded by an ovoid-shaped porous container 910 coated with a sealing substance 930. FIG. 10 depicts another illustrative embodiment in which one or more contents 1020 may, for example, be bounded by a pyramid-shaped porous container 1010 coated with a sealing substance 1030. FIG. 11 depicts yet another illustrative embodiment in which, for example, one or more contents 1120 may be bounded by a cube-shaped porous container 1110 coated with a sealing substance 1130.

According to some of the various embodiments, a variety of contents may be disposed in a porous container coated with a variety of sealing substances. For example, one possible embodiment may dispose powdered chocolate within a porous container coated with, for example, a sweetener such as crystallized sugar. Another embodiment may, for example, dispose instant coffee powder within a porous container coated with a sweetener, such as, for example, an artificial sweetener. Contents may comprise, but are not limited to: dried or fresh plant leaves, roots, flowers, fruits, stems, extracts, combinations thereof, and/or the like. Contents of still other embodiments of the invention may comprise, but are not limited to: powdered chocolate, powdered coffee, fruit-flavored-powders, artificially sweetened powders, combinations thereof, and/or the like. The sealing substance of embodiments of some of the various embodiments may comprise, but are not limited to: sugar, starch, salt honey, artificial sweeteners, combinations thereof, and/or the like.

Some of the various embodiments may be employed outside the field of brewable beverages. For example, some embodiment(s) may be employed to deliver a powdered or crystallized content to a solvent. Some of the various embodiments may employ a sealing substance appropriate for an intended solvent such that the sealing substance dissolves or loses its resistive quality when exposed to the intended solvent, thereby, allowing the contents to intermingle with the solvent and exit the container. For example, some of the various embodiments may dispose paint powder within a porous container coated with starch or a thin layer of dried paint.

Figure 12:
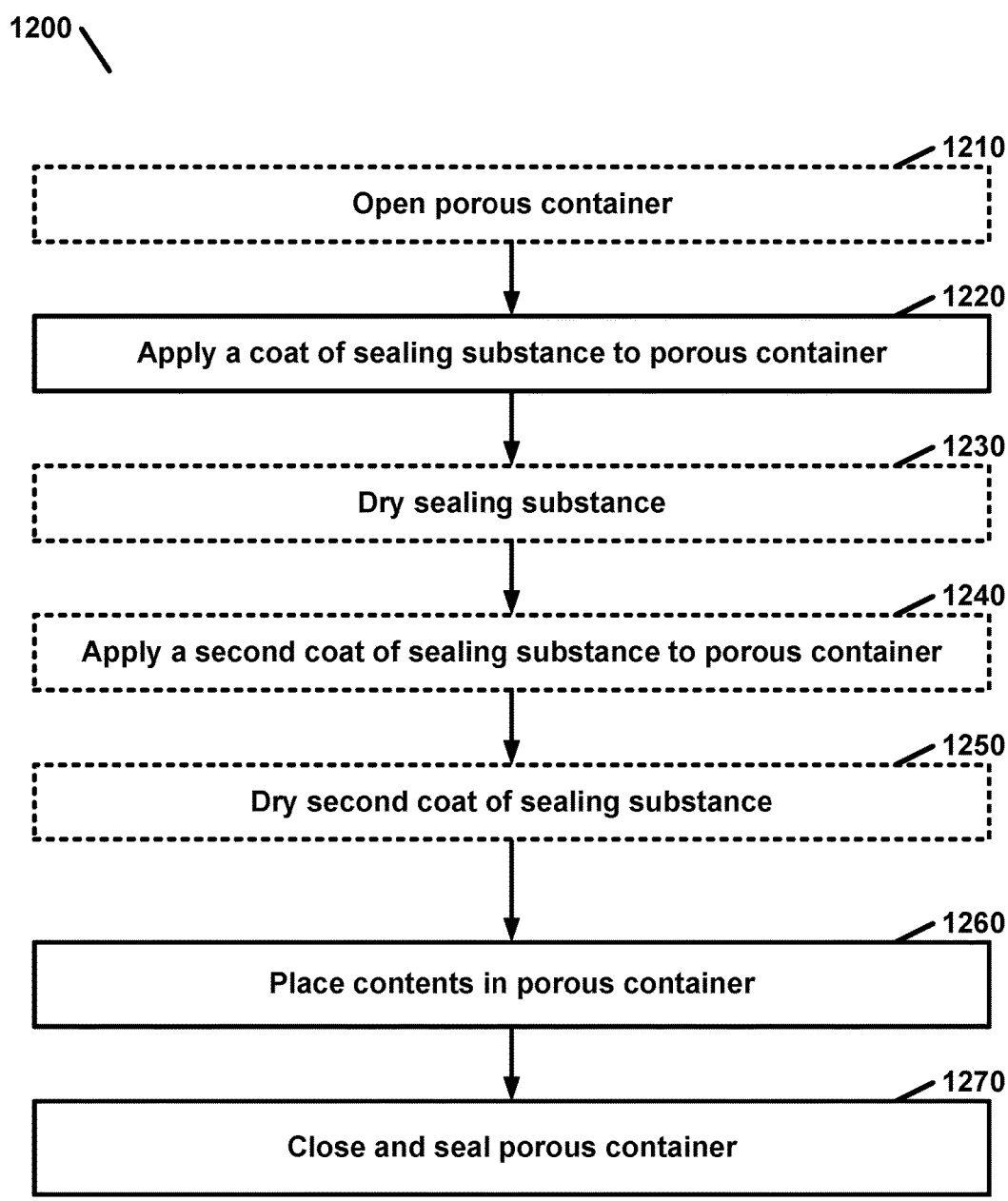
FIG. 12 is an example flow chart illustrating a method of making an embodiment where multiple coats of the sealing substance can be applied.

Referring to FIG. 12, some of the various embodiments may be made by optionally opening a porous container at 1210 and applying a coat of sealing substance to the porous container at 1220. As discussed previously, the sealing substance may be applied to the interior, exterior, or both the interior and exterior of the porous container. The sealing substance may optionally be allowed to dry at 1230 and a second coat optionally applied at 1240 and optionally allowed to dry at 1250. Contents may be placed in the porous container at 1260. The porous container may be sealed and closed at 1270. Variations are anticipated as illustrated in following examples.

Figure 13:
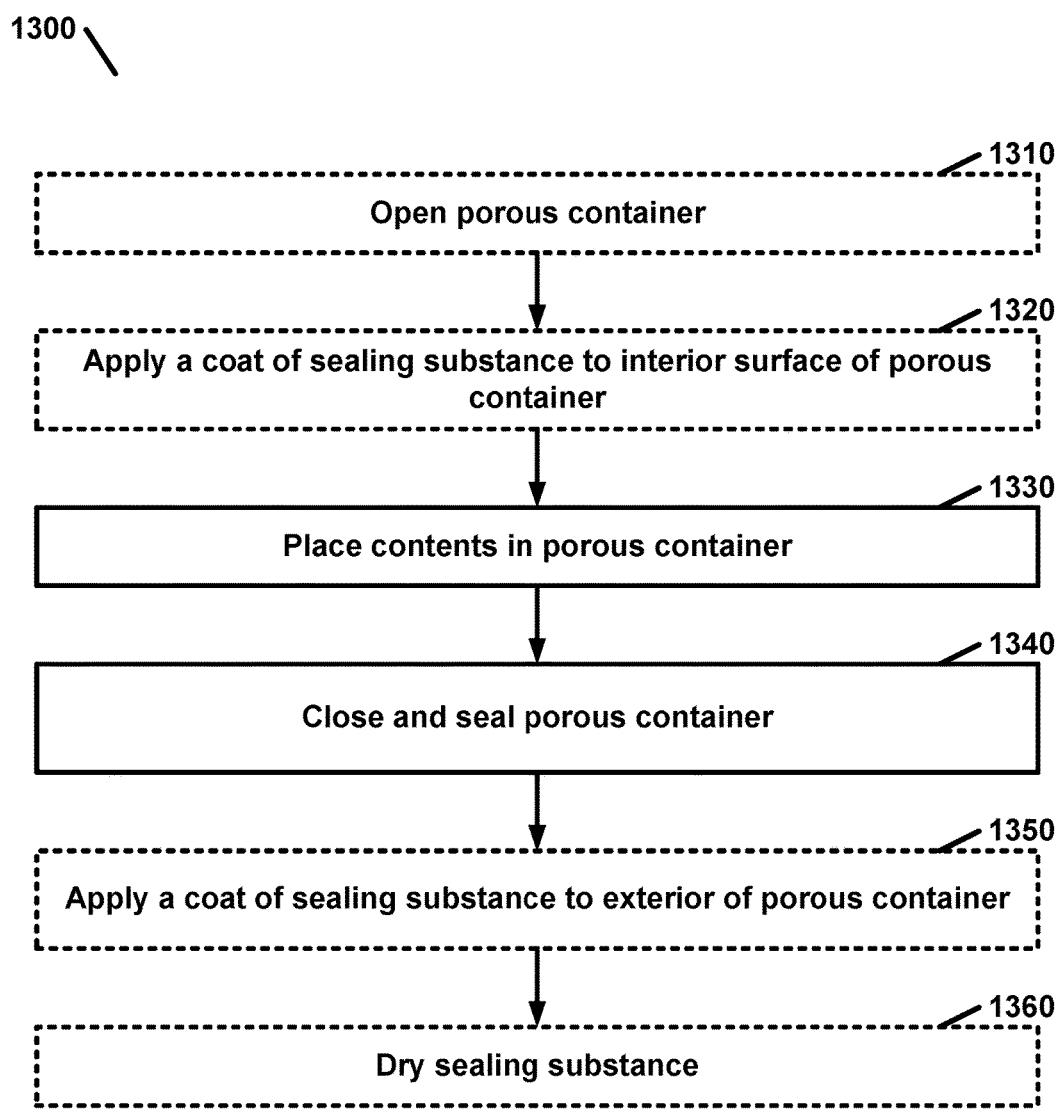
FIG. 13 is an example flow chart illustrating a method of making an embodiment where the sealing substance can be applied to interior, exterior, or both interior and exterior surfaces.

Referring to FIG. 13, some of the various embodiments may be made by optionally opening a porous container at 1310 and optionally applying a sealing substance to the interior surface of the porous container at 1320. Contents may be placed in the porous container at 1330 and sealed and closed at 1340. A sealing substance may optionally be applied to the exterior of the porous container at 1350. The sealing substance may optionally be allowed to dry at 1360.

Figure 14:
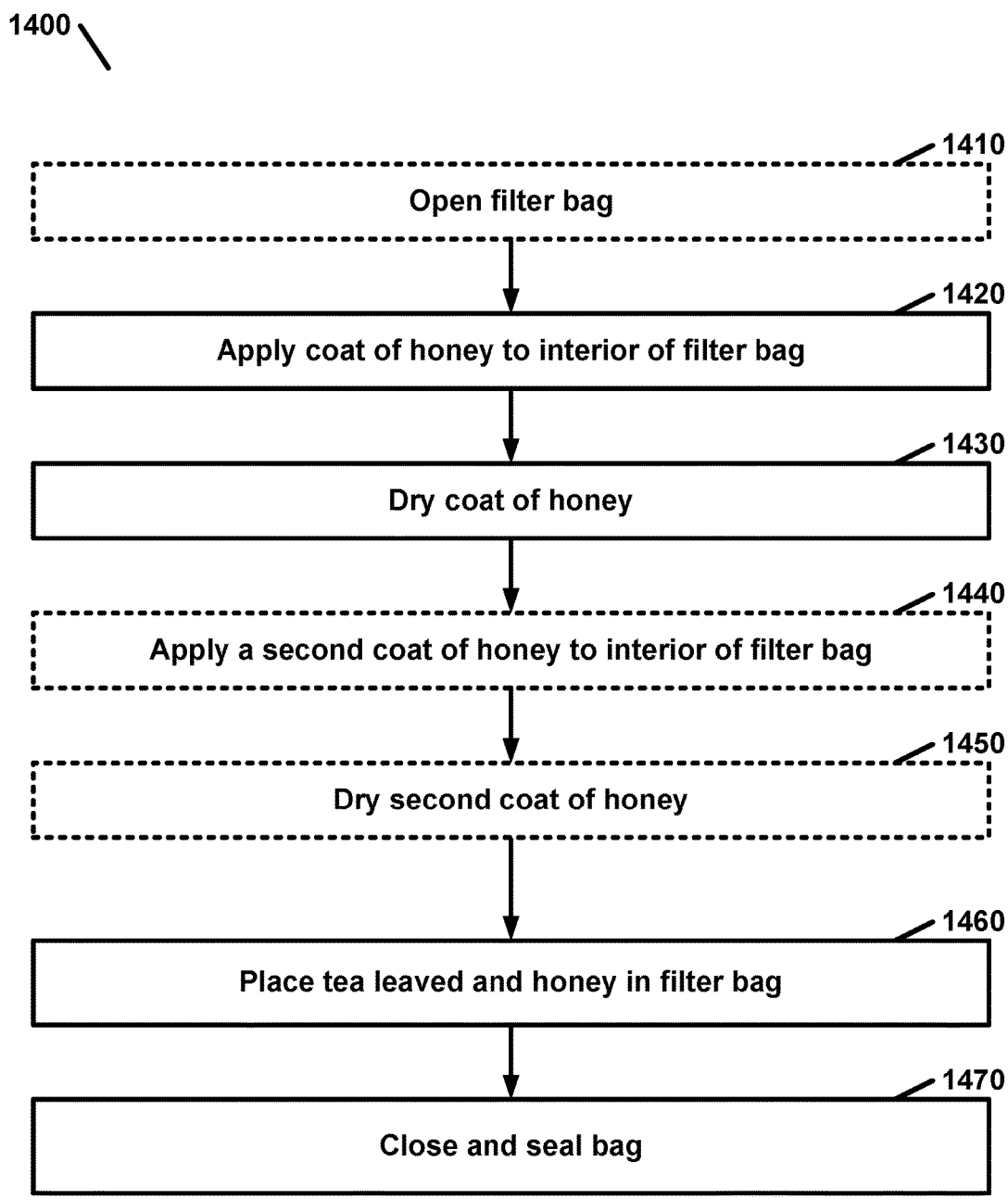
FIG. 14 is an example flow chart illustrating a method of making a honey tea bag embodiment of the invention with the sealing substance is applied to the interior of the container.

Referring to FIG. 14, according to another one of the various methods of making an embodiment, a filter bag may optionally be opened at 1410, or an already opened filter bag may have a coating such as, for example, a mixture comprising honey applied to the interior of the filter bag at 1420. The coating may be dried at 1430 and a second coat such as, for example, honey may be optionally applied to the interior of the filter bag at 1440 and optionally allowed to dry at 1450. Contents, such as, for example, tea leaves and honey may be placed in the filter bag at 1460. The filter bag may be closed and sealed at 1470.

Figure 15:
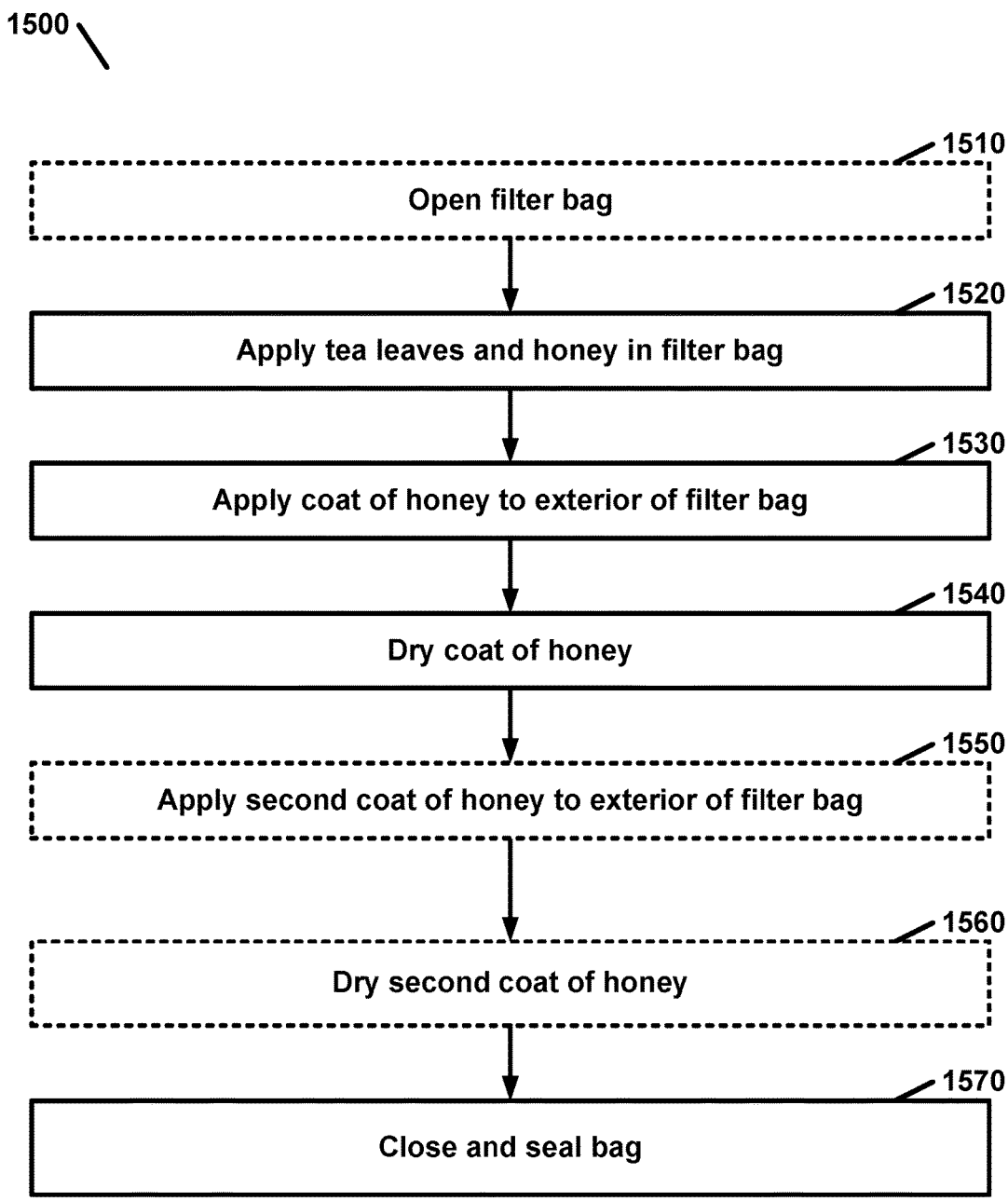
FIG. 15 is an example flow chart illustrating a method of making a honey tea bag embodiment of the invention where the sealing substance is applied to the exterior of the container.

Referring to FIG. 15, according to yet another one of the various methods of making an embodiment, a filter bag may be optionally opened at 1510. An already opened filter bag may have contents such as, for example, tea leaves and honey, placed within at 1520. A coating such as, for example, a mixture comprising honey may be applied to the exterior of the filter bag at 1530 and dried at 1540. A second coating such as, for example, a mixture comprising honey may be optionally applied to the exterior of the filter bag at 1550 and dried at 1560. The filter bag may be closed and sealed at 1570.

Figure 16:
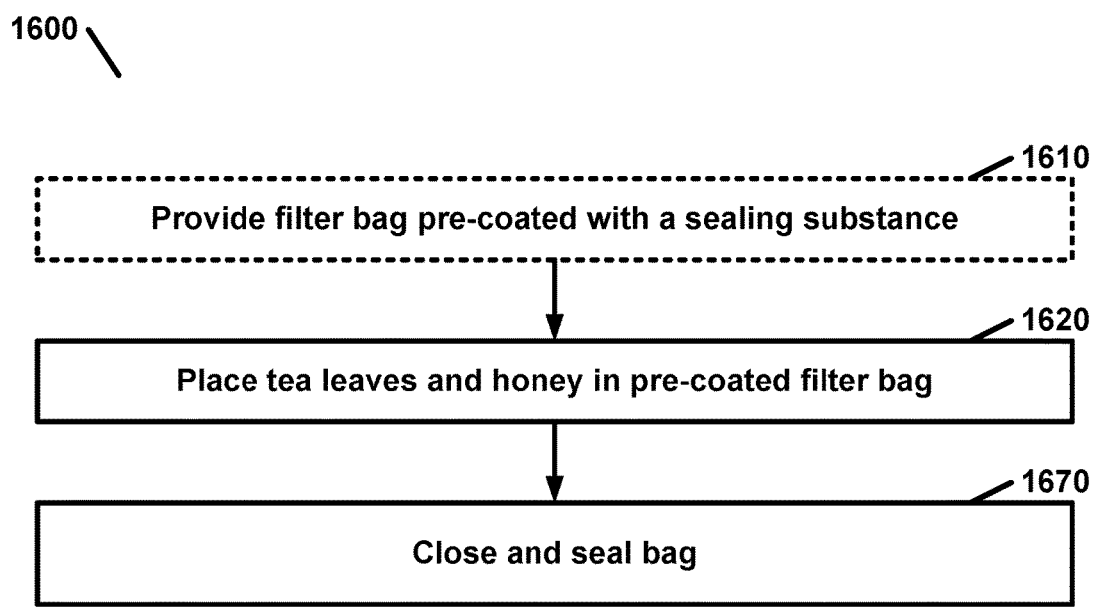
FIG. 16 is a flow chart illustrating a method of making of a honey tea bag embodiment of the invention where a container pre-coated with a sealing substance is employed to contain the honey and tea leaves.

Referring to FIG. 16, in yet another embodiment of making another, for example, tea bag embodiment, a filter bag pre-coated with a sealing substance may be provided at 1610. Contents, such as, for example, tea leaves and honey may be placed within the filter bag at 1620. The filter bag may be closed and sealed at 1630.

Figure 17:
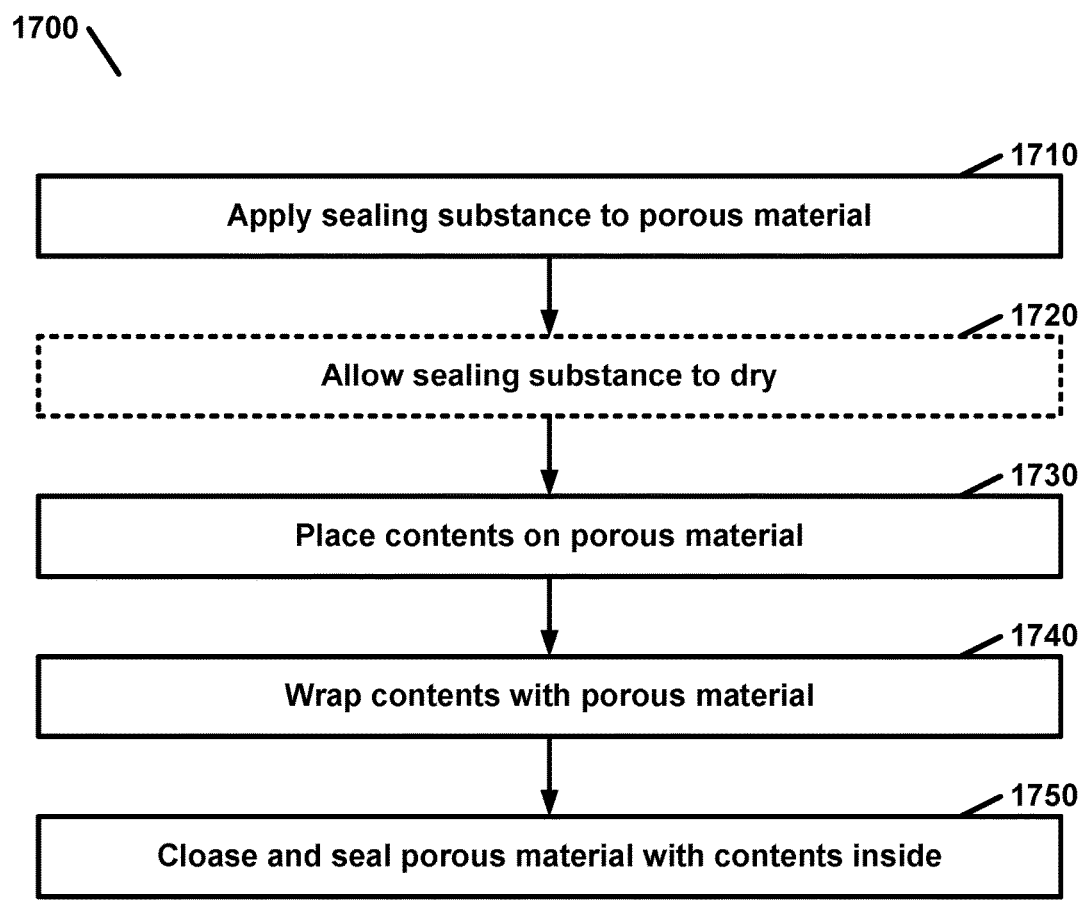
FIG. 17 is a flow chart illustrating a method of making of an embodiment of the invention where the contents are wrapped in a porous material coated with a sealing substances.

Referring to FIG. 17, in another example method of making an embodiment, a sealing substance may be applied to a porous material at 1710 and optionally allowed to dry at 1720. Contents may be placed on the porous material at 1730 and wrapped within the porous material at 1740. The porous material may be closed and sealed with the contents inside at 1750.

According to some of the various embodiments, an infuser may comprise a porous material. At least one brewable substance may be bounded by the container. Honey may be bounded by the container. A sealing substance may be applied to the material with pores. The sealing substance may be configured to resist substantial movement of at least a component of the at least on brewable substance and honey through the pores of the material. The brewable substance may comprise at least one of the following: tea; coffee; chocolate; leaves; roots; flowers; fruit; seed; natural honey; creamed honey; whipped honey; powdered honey; a seasoning substance; and a flavoring substance. The honey may be disposed between, above, or below the at least one brewable substance. The honey may comprise at least one of the following: natural honey; creamed honey; whipped honey; powdered honey; partially-crystallized honey; a dry flavoring substance; and a semi-dry flavoring substance. The sealing substance may be applied to at least part of an interior surface of the container, at least part of an exterior surface of the container, or at least part of both the interior and exterior surfaces of the container. The sealing substance may be disposed in the pores of the material. The sealing substance may be configured to have a lower solubility in water than the brewable substance. The sealing substance may be configured to have a lower solubility in water than the honey. The sealing substance may be configured to have a higher melting point than the brewable substance. The sealing substance may be configured to have a higher melting point than the honey. The sealing substance may comprise at least one of the following: honey, sugar, starch, and salt. The material with pores may comprises at least one of the following: paper, fabric, nylon, silk, plastic, porous polymer, porous membrane, semi-permeable membrane, metal; and/or the like. At least part of the container may be rigid. At least part of the container may be semi-rigid. (e.g., silicon rubber). At least part of the container may be flexible. The container may comprise a filter bag. At least part of the material with pores may comprise a substance dissolvable or miscible in water. The container may be configured to be refillable. The material with pores may be configured to dissolve in water. The infuser may further comprise water-insoluble packaging that at least partially encloses the container prior to use.

According to some of the various embodiments, an infuser may comprise a container comprising a material with pores; one or more contents bounded by the container; and a sealing substance applied to the material with pores, the sealing substance configured to resist substantial movement of the one or more contents through the pores of the material until the sealing substance is exposed to an external solvent. The sealing substance may be configured to substantially dissolve in or mix with a polar solvent. The polar solvent may comprise at least one of the following: water; tetrahydrofuran; ethyl acetate; acetone; dimethylformamide;

acetonitrile; propylene carbonate; formic acid; n-butanol; isopropanol; ethanol; methanol; acetic acid; and/or the like. The sealing substance may be configured to substantially dissolve in or mix with a non-polar solvent. The non-polar solvent may comprise at least one of the following: pentane; cyclopentane; hexane; cyclohexane; benzene; toluene; 1,2-dioxane; chloroform; diethyl ether; bichloromethane; and/or the like. The sealing substance may be configured to substantially dissolve in or mix with at least one of the following: mineral spirits; turpentine; naptha; methyl ethyl ketone; glycol ether; ethylbenzene; xylene; n-butyl acetate; butan-1-ol; and/or the like. The sealing substance may be configured to have a lower solubility in a solvent than the one or more contents. The sealing substance may be configured to have a higher melting point than the one or more contents. The sealing substance may be configured to melt at a temperature above 105° F. The material with pores may comprise at least one of the following: paper, fabric, nylon, silk, plastic, porous polymer, porous membrane, semi-permeable membrane, metal, and/or the like. The container may be refillable. The material with pores may be configured to dissolve the external solvent. The infuser may further comprise packaging insoluble in the external solvent that at least partially encloses the container prior to use.

Some of the various embodiments may comprise a process of making an infuser comprising: applying a sealing substance to a material with pores, wherein the sealing substance may be configured to resists substantial movement of at least one of a brewable substance and honey through the pores of the material; and bounding the brewable substance or honey by the material with pores. The applying of the sealing substance may comprise applying the sealing substance by at least one of the following mechanisms: immersion; spraying; blowing; painting; dipping; and/or the like. The process may further comprising allowing the sealing substance to at least partly dry on the material with pores prior to bounding the brewable substance or honey by the material with pores. The brewable substance may comprises at least one of the following: tea; coffee; chocolate; leaves; roots; flowers; fruit; seed; natural honey; creamed honey; whipped honey; powdered honey; a seasoning substance; a flavoring substance; and/or the like. The brewable substance comprises tea leaves mixed with honey. The honey may comprise at least one of the following: natural honey; creamed honey; whipped honey; powdered honey; partially-crystallized honey; a dry flavoring substance; a semi-dry flavoring substance; and/or the like. The honey may be disposed between, above, or below the tea leaves. The applying of the sealing substance may comprise applying the sealing substance to at least part of an interior surface of the material, an exterior surface of the material, or both said interior and exterior surfaces of the material. The applying of the sealing substance may comprise disposing the sealing substance in the pores of the material. The sealing substance may be configured to have a lower solubility in water than the brewable substance. The sealing substance may be configured to have a lower solubility in water than the honey. The sealing substance may be configured to have a higher melting point than the brewable substance. The sealing substance may be configured to have a lower solubility in water than the honey. The sealing substance may comprise at least one of the following: honey; sugar; starch; salt; and/or the like. The material with pores may comprise at least one of the following: paper, fabric, nylon, silk, plastic, porous polymer, porous membrane, semi-permeable membrane, metal; and/or the like. At least part of the material with pores may comprises a substance dissolvable or miscible in water. At least part of the material with pores may be rigid. At least part of the material with pores may be semi-rigid. (e.g., silicon rubber). At least part of the material with pores may be flexible. The material with pores may comprise a filter bag.

According to some of the various embodiments, a process for making an infuser may comprise: applying a sealing substance to a material with pores, wherein the sealing substance may be configured to resist substantial movement of one or more contents through the pores of the material; and bounding the one or more contents by the material with pores. The sealing substance may be applied by at least one of the following mechanisms: immersion; spraying; blowing; painting; dipping; and/or the like. The sealing substance may at least partly dry on the material with pores prior to bounding the one or more contents by the material with pores. The sealing substance may be configured to substantially dissolve in or mix with a polar solvent. The polar solvent may comprise at least one of the following: water; tetrahydrofuran; ethyl acetate; acetone; dimethylformamide; acetonitrile; propylene carbonate; formic acid; n-butanol; isopropanol; ethanol; methanol; acetic acid; and/or the like. The sealing substance may be configured to substantially dissolve in or mix with a nonpolar solvent. The nonpolar solvent comprises at least one of the following: pentane; cyclopentane; hexane; cyclohexane; benzene; toluene; 1,2-dioxane; chloroform; diethyl ether; and bichloromethane. The sealing substance may be configured to substantially dissolve in or mix with at least one of the following: mineral spirits; turpentine; naptha; methyl ethyl ketone; glycol ether; ethylbenzene; xylene; n-butyl acetate; butan-1-ol; and/or the like. The sealing substance may be configured to have a lower solubility in a solvent than the one or more contents. The sealing substance may be configured to have a higher melting point than the one or more contents. The sealing substance may be configured to melt at a temperature above 105° F. The material with pores may comprise at least one of the following: paper, fabric, nylon, silk, plastic, porous polymer, porous membrane, semi-permeable membrane, metal; and/or the like. The one or more contents may comprise a particulate with a diameter less than the diameter of pores in the material comprising the container.

According to some of the various embodiments, a process of using an infuser may comprise: immersing in water, a container comprising a material with pores, at least one brewable substance and honey bounded by the container, and a sealing substance applied to the material with pores, the sealing substance configured to resist substantial movement of the at least one brewable substance and honey through pores of the container; the water having a temperature configured to cause: the sealing substance to dissolve or mix with the water; effectuating the water to pass through the pores of the material comprising the container to intermingle with the one or more brewable substances and honey. The at least one brewable substance comprises at least one of the following: tea; coffee; chocolate; leaves; roots; flowers; fruit; seed; natural honey; creamed honey; whipped honey; powdered honey; a seasoning substance; and a flavoring substance. The at least one brewable substance may comprise tea leaves mixed with honey. The honey may comprise at least one of the following: natural honey; creamed honey; whipped honey; powdered honey; partially-crystallized honey; a dry flavoring substance; a semi-dry flavoring substance; and/or the like. The sealing substance may be applied to at least part of an interior surface of the container, an exterior surface of the container, or both said interior and exterior surfaces of the container. The sealing substance may be disposed in the pores of the material. The sealing substance may be configured to have a lower solubility in water than the brewable substance. The sealing substance may be configured to have a lower solubility in water than the honey. The sealing substance may be configured to have a higher melting point than the brewable substance. The sealing substance may be configured to have a lower solubility in water than the honey. The sealing substance may comprise at least one of the following: honey; sugar; starch; salt; and/or the like. The material with pores may comprise at least one of the following: paper, fabric, nylon, silk, plastic, porous polymer, porous membrane, semi-permeable membrane, metal, and/or the like. At least part of the material with pores may comprise a substance dissolvable or miscible in water. At least part of the material with pores may be rigid. At least part of the material with pores may be semi-rigid. (e.g., silicon rubber). At least part of the material with pores may be flexible. The material with pores may comprise a filter bag.

According to some of the various embodiments, a process of using an infuser may comprise: immersing in a solvent, a container comprising a material with pores, one or more contents bounded by the material with pores, and a sealing substance applied to the material with pores, wherein said sealing substance is configured to resist substantial movement of the one or more contents through the pores of the material; the solvent configured to cause: the sealing substance to dissolve or mix with the solvent; effectuating the solvent to pass through the pores of the material comprising the container to intermingle with the one or more contents. The sealing substance may be configured to substantially dissolve in or mix with a polar solvent. The polar solvent may comprise at least one of the following: water; tetrahydrofuran; ethyl acetate; acetone; dimethylformamide; acetonitrile; propylene carbonate; formic acid; n-butanol; isopropanol; ethanol; methanol; acetic acid; and/or the like. The sealing substance may be configured to substantially dissolve in or mix with a non-polar solvent. The non-polar solvent may comprise at least one of the following: pentane; cyclopentane; hexane; cyclohexane; benzene; toluene; 1,2-dioxane; chloroform; diethyl ether; bichloromethane; and/or the like. The sealing substance may be configured to substantially dissolve in or mix with at least one of the following: mineral spirits; turpentine; naptha; methyl ethyl ketone; glycol ether; ethylbenzene; xylene; n-butyl acetate; butan-1-ol; and/or the like. The sealing substance may have a lower solubility in a solvent than the one or more contents. The sealing substance may have a higher melting point than the one or more contents. The sealing substance may be configured to melt at a temperature above 105° F. The material with pores may comprise at least one of the following: paper, fabric, nylon, silk, plastic, porous polymer, porous membrane, semi-permeable membrane, metal, and/or the like. The one or more contents may comprise a particulate with a diameter less than the diameter of pores in the material comprising the container.

According to some of the various embodiments, an infuser may comprise: a container comprising a material with pores; a diffusible substance and honey bounded by the container; and a means for reversibly resisting substantial movement of the diffusible substance and honey through the pores of the material. The diffusible substance may comprise at least one of the following: tea; coffee; chocolate; leaves; roots; flowers; fruit; seed; natural honey; creamed honey; whipped honey; powdered honey; a seasoning substance; a flavoring substance; and/or the like. The diffusible substance may comprise tea leaves mixed with honey. The honey may be disposed between, above, or below the tea leaves. The honey may comprise at least one of the following: natural honey; creamed honey; whipped honey; powdered honey; partially-crystallized honey; a dry flavoring substance; a semi-dry flavoring substance; and/or the like. The sealing substance may be applied to at least part of an interior surface, an exterior surface, or both said interior and exterior surfaces of the material with pores. The sealing substance may be disposed in the pores of the material. The sealing substance may be configured to have a lower solubility in water than the brewable substance. The sealing substance may be configured to have a lower solubility in water than the honey. The sealing substance may be configured to have a higher melting point than the diffusible substance. The sealing substance may be configured to have a lower solubility in water than the honey. The sealing substance may comprise at least one of the following: honey, sugar, starch, salt, and/or the like. The material with pores may comprise at least one of the following: paper, fabric, nylon, silk, plastic, porous polymer, porous membrane, semi-permeable membrane, metal, and/or the like. At least part of the container may be rigid. At least part of the container is semi-rigid. (e.g., silicon rubber). At least part of the container is flexible. The container may comprise a filter bag. At least part of the material with pores may comprise a substance dissolvable or miscible in water. The container may be configured to be refillable. The material with pores may be configured to dissolve the external solvent. The infuser may further comprise packaging insoluble in the external solvent that at least partially encloses the container prior to use.

According to some of the various embodiments, an infuser may comprise: a means for bounding one or more contents employing a material with pores; and a resisting means for reversibly resisting substantial movement of the one or more contents through the pores of the material. The resisting means may employ a sealing substance configured to substantially dissolve in or mix with a polar solvent. The polar solvent may comprise at least one of the following: water; tetrahydrofuran; ethyl acetate; acetone; dimethylformamide; acetonitrile; propylene carbonate; formic acid; n-butanol; isopropanol; ethanol; methanol; acetic acid; and/or the like. The sealing substance may be configured to substantially dissolve in or mix with a non-polar solvent. The non-polar solvent may comprise at least one of the following: pentane; cyclopentane; hexane; cyclohexane; benzene; toluene; 1,2-dioxane; chloroform; diethyl ether; bichloromethane; and/or the like. The sealing substance may be configured to substantially dissolve in or mix with at least one of the following: mineral spirits; turpentine; naptha; methyl ethyl ketone; glycol ether; ethylbenzene; xylene; n-butyl acetate; butan-1-ol; and/or the like. The sealing substance may be configured to have a lower solubility in a solvent than the one or more contents. The sealing substance may be configured to have a higher melting point than the one or more contents. The sealing substance may be configured to melt at a temperature above 105° F. The material with pores may comprise at least one of the following: paper, fabric, nylon, silk, plastic, porous polymer, porous membrane, semi-permeable membrane, metal, and/or the like. The container may be configured to be refillable. The material with pores may be configured to dissolve the external solvent. The infuser may further comprise packaging insoluble in the external solvent that at least partially encloses the container prior to use.

Some of the various embodiments of the present invention introduce honey into a tea bag with minimal leakage. Honey is a natural preservative that generally contains a significant amount of water content making it a viscous liquid. However, when the water is removed, the honey can become a solid. When water is introduced to the dried solid honey, it becomes liquid again. If the water is hot enough, the honey will dissolve into the water.

Honey can also be made into a mostly solid state by allowing it to naturally crystallize. This is called creamed honey. Creamed honey can be produced by introducing about 10% or more of already creamed honey into regular honey and letting the mixture sit at a cool temperature.

These characteristics of honey may be employed to produce a tea bag that holds honey with minimal leakage. First, a tea bag may be coated with a thin coat of honey. One way of applying the coat of honey is via a spray gun (e.g. an airbrush), a brush, dipping, etc. The coating can be applied before or after the ingredients are introduced into the bag. The bag may be filed with tea, creamed honey and then sealed. Once the coating is dry, the bag prevents the honey from leaking until the bag is introduced to hot water. Once the bag is introduced into hot water, the honey coating dissolves. Once the honey coating dissolves, the hot water, creamed honey and tea mixture can intermix producing a naturally honey sweetened tea.

Embodiments of the present invention relate generally to the provision of a novel infusion package. One of the various uses of an infusion package is to produce beverages such as tea, coffee and/or the like. However, one skilled in the art will recognize that this novel infusion package configuration may be employed in other areas wherein an infusion package may be employed to create a solution by mixing a substance and a solute, for example, an infusion package for mixing glue, paint, and/or the like.

According to some of the various embodiments, the infusion package may comprise a tea bag. A tea bag is a small, porous sealed bag containing tea leaves and used with water for brewing the beverage called tea, or herbs or spices for brewing herbal teas (also known as "tisane"). Tea bags are commonly made of filter paper, silk or food grade plastic. The bag contains the tea leaves while the tea is steeped, making it easier to dispose of the leaves, and performs the same function as a tea infuser. Some tea bags have an attached piece of string with a paper label at the top that assists in removing the bag while also displaying the brand and/or variety of tea. Some tea bags (and other infusion packages) may employ folded filter materials. Additionally, infusion packages may be applied to other types of materials such as, for example, coffee in the form of coffee bags.

A porous filtering medium (or a porous material) is a material containing pores (voids). The skeletal portion of the material may be called the "matrix" or "frame". The pores may be configured to allow a fluid (liquid or gas) to pass while holding back solid materials that are larger than the pores. The skeletal material may be a solid, but alternative structures may comprise structures such as foams, sponges, and/or the like.

A porous medium may be characterized by its porosity. However, other properties of the medium (e.g., permeability, tensile strength, electrical conductivity) may sometimes be derived from the respective properties of a porous mediums' constituents (solid matrix and fluid) and the media porosity and pores structure. Often both the solid matrix and the pore network (also known as the pore space) are continuous, so as to form two interpenetrating continua such as in a sponge. However, there is also a concept of closed porosity and effective porosity, i.e., the pore space accessible to flow. Porous mediums may comprise man-made materials such as filter paper, filter sheets, cements, ceramics, screens, and/or the like. Porous mediums may comprise natural substances such as rocks, soil components, zeolites, biological tissues (e.g. bones, wood, cork), and/or the like. The porous material may be selected based upon its ability to allow fluid flow through the porous media. In other words, the porous material may be selected based, at least in part, on flowability.

Tea bag paper may be related to paper found in milk and coffee filters and may comprise a blend of wood fibers, vegetable fibers, synthetic fibers, synthetic materials, and/or the like. The vegetable fiber may be bleached pulp abaca hemp, a plantation banana plant grown for its fiber, mostly in the Philippines and Colombia. Heat-sealed tea bag paper may comprise a heat-sealable thermoplastic such as PVC or polypropylene as a component fiber on the inner tea bag surface. Synthetic materials such as polymers made from epichlorohydrin may be employed in the manufacturing tea bags. Similarly, infusion packages may comprise other synthetic materials such as, for example, silicon rubber and/or the like.

Tea bags may be produced using machines, parts of machines, or modified machines from companies such as MAI from Mar del Plata, Argentina, Teepack from Meerbusch, Germany, and IMA, from Bologna, Italy. A standard machine produced by the MAI company may fill 100 plus bags per minute with ingredients of up to approximately 3.3 grams per bag. Another company, the Italian Tecnomeccanica, may be capable of filling 250 tetrahedral bags per minute.

Some infusion packages may have open-ended pouches with long flaps. The pouch may be filled with an appropriate quantity of ingredients and the flap is closed into the pouch to retain the ingredients. Tea bags and other infusion packages may be formed in numerous shapes such as, but not limited to: square shapes, rectangular shapes, circular shapes, tetrahedral shapes, and/or the like.

Some of the various pourous materials may have pours configured to hold back various size materials. For example, a wide variety of herbs can be purchased as "tea bag cut", a grade which is specified in terms of particle size, typically with the bulk of the leaves around 1-1.5 mm.

Some Tea bags and other infusion packages may be configured to allow the use of larger ingredients, such as those that may contain larger tea leaf fragments. For example, some nylon tetrahedral tea bag may allow more room for the leaf to steep. Some filter materials may be selected for their health and biodegradability characteristics. (e.g. silk over nylon). Another material for infusion packages is Soilon, made from corn starch.

A solution may be a mixture that includes a solute substance dissolved (or partially dissolved) in a solvent substance. The solvent may do the dissolving. The solution may, more or less, take on the characteristics of the solvent including its phase, and the solvent may be the major fraction of the mixture. The concentration of a solute in a solution may be a measure of how much of that solute is dissolved in the solvent.

An example of one of various solutions that may be produced using embodiments may be a beverage. A beverage may include a drink or other liquid prepared for human consumption. Examples of beverages include, but are not limited to: juice, soft drinks, carbonated drinks, coffee, teas, combinations thereof, and/or the like. Tea is an aromatic beverage commonly prepared by pouring hot or boiling water over leaves of the tea plant at which time the hot water may act as a solvent to dissolve parts of the tea leaves (acting as a solute) to form a tea solution. Some beverages may include alcohol.

Creamed honey is a honey that has been processed to control crystallization. Creamed honey may contain a large number of small crystals, which prevent the formation of larger crystals that can occur in unprocessed honey. The processing may also produce a honey with a smooth spreadable consistency. Other names for creamed honey include whipped honey, spun honey, churned honey, candied honey, honey fondant, and (in the UK) set honey. In other words, creamed honey may be formed when micro crystals form and spread in the honey due, in part, because of the large sugar content in honey. One process for initiating the process of creating creamed honey may include introducing seed crystal(s) into the honey. The honey may then be cooled, for example, through refrigeration. As the honey crystallizes, the viscosity of the honey may increase and the clarity of the honey may decrease. Pre-creamed honey may, for example, be made of 90-95% regular honey and 5-10% creamed honey. Tea and honey may be stored together in an infuser container. For example, an infuser may hold a layer of tea leaves, followed by a layer of pre-creamed honey, and topped with a final layer of tea leaves. The approximate amounts may be adjusted for variations in container size, performance, taste, combinations thereof, and/or the like. In another embodiment, a beverage medium may be made from blending tea leaves with pre-creamed honey. For various embodiments, if a greater or lesser quantity of tea leaves and pre-creamed honey are used, the shape of the pod may alter to accommodate this change.

According to the various embodiments, presweetening with creamed honey by many processes beyond what has been described above, including, but not limited to: mixing the substance with the creamed honey, blending the substance with the creamed honey, coating the substance with the creamed honey, chemically bonding the creamed honey to the substance. For example, when a substance is tea, the tea may be coated with a layer of creamed honey prior to being placed in the container. Expanding on the tea example, the tea may be mixed or blended with creamed honey prior to being placed in the container. The blending and/or mixing may employ a mechanical device such as a blender. The substance and the honey may be pre-processed together prior to being placed in the container. Preprocessing may include heating the substance (e.g. tea, coffee, etc) along with honey, and potentially a liquid. Crystals may then be introduced into the resultant mixture and cooled to let the sugar content of the honey crystallize.

Substance(s), may include, at least part, a brewable ingredient. Additionally, the substance, may include, at least part, a sweetener such as, but not limited to, creamed honey, sugar, artificial sweeteners, stevia, aspartame, sucralose, neotame, acesulfame potassium, saccharin, combinations thereof, and/or the like.

The filter (material with pores) may be configured to: hold back a majority of the substance; and pass a majority of the solution. So for example, when the substance is tea, the filter may be configured to hold back tea leaves while allowing the liquid tea to pass. To accomplish this, the filter may include, at least in part, a permeable filter paper.

The foregoing description provides illustration and description, but is not intended to be exhaustive or to limit the implementations to the precise form disclosed. Modifications and variations are possible in light of the above teachings or may be acquired from practice of the implementations. Such alterations, modifications, and improvements are intended to be part of this disclosure, and are intended to be within the spirit and scope of the invention. Accordingly, the foregoing description and drawings are by way of example only. For example, embodiments are disclosed towards consumable beverages. However, one skilled in the art will recognize that the disclosed embodiments could be employed to, for example, be used to mix glue or to dispense medicine.

In this specification, "a" and "an" and similar phrases are to be interpreted as "at least one" and "one or more." References to "an" embodiment in this disclosure are not necessarily to the same embodiment. It should be noted the terms "including" and "comprising" should be interpreted as meaning "including, but not limited to".

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An infuser comprising a container comprising a flexible material with pores; at least one brewable substance bounded by the container; creamed honey in a semi-solid state bounded by the container; and a sealing substance comprising dried honey disposed in the pores of the material with pores, and applied to an interior surface of the material with pores and an exterior surface of the material with pores, wherein the sealing substance is configured to resist substantial movement of at least a component of the at least one brewable substance and creamed honey through the pores of the material until the sealing substance reaches a temperature above 105 degrees Fahrenheit.

2. The infuser of claim 1, wherein the brewable substance comprises at least one of the following: tea; coffee; chocolate; leaves; roots; flowers; fruit; seed; natural honey; whipped honey; powdered honey; a seasoning substance; and a flavoring substance.

3. The infuser of claim 1, wherein the creamed honey is disposed between, above, or below the at least one brewable substance.

4. The infuser of claim 1, further comprising at least one of the following bounded by the container: natural honey; whipped honey; powdered honey; partially-crystallized honey; a dry flavoring substance; and a semi-dry flavoring substance.

5. The infuser of claim 1, wherein the sealing substance is applied by spraying at least part of at least one of the following: an interior surface of the material with pores, and an exterior surface of the material with pores.

6. The infuser of claim 1, wherein the sealing substance is configured to have a lower solubility in water than the brewable substance.

7. The infuser of claim 1, wherein the sealing substance is configured to have a lower solubility in water than the creamed honey.

8. The infuser of claim 1, wherein the sealing substance is configured to have a higher melting point than the brewable substance.

9. The infuser of claim 1 wherein the sealing substance is configured to have a higher melting point than the creamed honey.

10. The infuser of claim 1, wherein the sealing substance further comprises at least one of the following: sugar, starch, and salt.

11. The infuser of claim 1, wherein the material with pores comprises at least one of the following: paper, fabric, nylon, silk, plastic, porous polymer, porous membrane, semi-permeable membrane, and metal.

12. The infuser of claim 1, wherein at least part of the container is rigid.

13. The infuser of claim 1, wherein at least part of the container is semi-rigid.

14. The infuser of claim 1, wherein at least part of the container is flexible.

15. The infuser of claim 1, wherein the container comprises a filter bag.

16. The infuser of claim 1, wherein at least part of the material with pores comprises a substance dissolvable or miscible in water.

17. The infuser of claim 1, wherein the container is configured to be refillable.

18. The infuser of claim 1, wherein the material with pores is configured to dissolve in water.

19. The infuser of claim 1, further comprising water-insoluble packaging that at least partially encloses the container prior to use.

* * * * *